United States Patent Office 3,449,088
Patented June 10, 1969

3,449,088
EXTRACTION OF LITHIUM, CALCIUM AND MAGNESIUM BROMIDES USING HYDROXY-ETHERS AND GLYCOLS
John M. Lee, Lake Jackson, Tex., assignor to The Dow Chemical Company, Midland, Mich., a corporation of Delaware
No Drawing. Filed Apr. 1, 1965, Ser. No. 444,851
Int. Cl. B01j 9/04
U.S. Cl. 23—312                  10 Claims

ABSTRACT OF THE DISCLOSURE

A process for the selective extraction of bromine values and the associated metal values from brines which comprises intimately contracting said brine with certain glycol derivatives or hydroxyl-containing polyethers as extraction agents. After contact, the extraction agent containing the bromine and metal values is separated from the depleted brine.

---

This invention relates to a process for the extraction of brines, and more particularly relates to a process for extracting bromine and metal values from brines containing the same.

For many years, brines have been known to be a valuable source for halogens, for sodium and potassium chlorides, for Na and K and for other valuable metals. Since bromine and other values such as metals occur in brines in relatively small quantities as compared to the sodium or potassium chloride, special methods have been necessary for their separation. For instance, bromine has been recovered by acidifying and air blowing certain brines. Likewise, recovery has been effected electrolytically and by treating the brine with an insoluble chemical which is reactive with bromine values. While some of these processes have been used commercially, they have been inefficient, costly and generally unsatisfactory.

It has now been discovered, however, that bromine and metal values may be selectively extracted from brines by intimately contacting said brine with an organic extraction agent, separating said organic extraction agent from said brine and subsequently removing the bromine and metal values from the organic extraction agent.

Whether or not a particular polar organic compound may be used as a selective brine extraction agent is, in general, not predictable in advance. It has been found that a few limited classes of compounds are operative but in other classes even next adjacent homologues may produce pronounced differences in result. All operative compounds, however, appear to produce exceptionally good selectively and capacity. It has been found that the organic extraction agents possessing the ability to selectively extract bromine and metal values from brines containing the same are glycol derivatives or hydroxyl containing polyethers selected from one of the following groups:

(1) A hydroxyether having the formula $$HO—(CH_2—CH_2—O)_nR$$

wherein $n$ represents a number of from 1 to about 8 and R represents a hydrocarbon radical containing from 4 to about 20 carbon atoms;

(2) A member selected from the group consisting of the phenyl ether of dipropylene glycol, the nonyl phenyl ether of dipropylene glycol, the methyl ether of tripropylene glycol, the methyl ether of tetrapropylene glycol, the amyl ether of tetrapropylene glycol, the hydroxyethyl ether of tripropylene glycol, bis(2-phenyl-2-hydroxyethyl ether) of tripropylene glycol, bis(2-phenyl-2-hydroxyethyl ether) of dipropylene glycol, dimethyl ether of diethylene glycol, butyl isopropyl diether of diethylene glycol.

(3) Polypropylene glycols having an average molecular weight of from about 200 to about 1000.

(4) Diethers of ethylene glycols have the formula

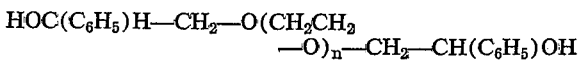

wherein $n$ is a number from 2 to 8.

(5) A glycerine initiated polyalkylene glycol having the formula

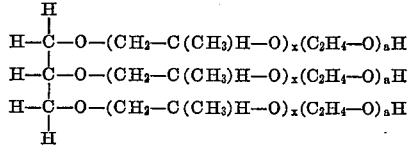

wherein $x$ and $a$ are numbers such that the average molecular weight of the compound is between 800 and 4000 and $a$ equals from 5–25% of the sum of $a+x$.

The organic extraction agents used herein are polar compounds which are at least slightly miscible with water. Generally they will form two phases with brine more readily than with plain water. If, however, the layer separation does not occur or occurs to a lesser extent than is considered desirable for a particular operation, any suitable substantially saline water-immiscible organic diluent such as benzene, hexane, or ethylene dichloride may be added to improve phase separation. When a saline water-immiscible organic diluent is employed to improve phase separation, it has been found that no more of such diluent should be employed than is necessary to produce the desired phase separation. Excessive amounts of diluent tend to interfere with the selectivity of the solvent.

Brines suitable for extraction with these polar organic extraction agents include those sodium and potassium chloride brines containing as little as 10 p.p.m. bromine values occurring as bromides. These bromine values and the associated metal values may then be selectively extracted from the brines while extracting only minimal amounts of chlorides. Brines which contain significant concentrations of lithium bromide are especially suitable.

The ratio of organic extraction solvent to brine is not critical to the operation of this process but, in general, a range of 1/10 to 10/1 by volume is desirable.

Treatment temperature and pressure during the extraction may be varied to fit the physical characteristics of the particular solvent employed but ambient temperatures and pressures are generally sufficient. For the more volatile solvents, of course, lower temperatures or increased pressures may be advantageous while the more viscous solvents may require some increase in temperature or decrease in pressure to achieve maximum efficiency. Also, it is generally true that for a given solvent, the lower the temperature, the greater the Br extraction will be.

Contact time between the organic extraction solvent and the brine, prior to layer separation may vary over a wide range. In general, however, the contact time required to absorb a significant quantity of bromine and metal values has been found to be relatively short. Generally, any time in excess of 5 minutes is suitable and times in excess of 60 minutes are not harmful but are generally of no particular advantage. Contact times of less than 5 minutes can usually be employed, however, if sufficient agitation is used to insure adequate contacting of the two phases during this period.

After the organic extraction solvent and brine have formed into discrete layers, separation may be accomplished by simply draining off one or both layers, either

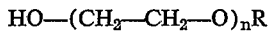

batchwise or continuously. Once the organic extraction layer has been isolated from the brine layer, recovery of the bromine and metal values may be effected in any suitable manner.

formed and settled. The layers were separated and an analysis was conducted to determine the bromine and metal values extracted. The results of these experiments were as follows:

TABLE I

| Run No. | Organic Extraction Agent | Aqueous Layer after Extraction | | Organic Layer after Extraction | |
|---|---|---|---|---|---|
| | | P.p.m. Br | Wt. Percent Organic | Wt. Percent $H_2O$ | P.p.m. Br |
| 1 | Methyl ether of tripropylene glycol ($HO-CH_2C(CH_3)H-O-CH_2C(CH_3)H-OCH_2C(CH_3)H-O-CH_3$). | 3,200 | 9.0 | 11.1 | 720 |
| 2 | Butyl ether of diethylene glycol ($HO-CH_2CH_2-O-CH_2CH_2-O-C_4H_9$) | | | 20.8 | 1,700 |
| 3 | Dimethyl ether of diethylene glycol ($CH_3-O-CH_2CH_2-O-CH_2CH_2-O-CH_3$) | | | 10.0 | 400 |
| 4 | 2-octyl ether of diethylene glycol $HO-CH_2-CH_2-O-CH_2-CH_2-O-C_8H_{17}$ | | | 6.6 | 850 |
| 5 | Phenyl ether of diethylene glycol $HO-CH_2-CH_2-O-CH_2-CH_2-O-C_6H_5$ | | | 9.49 | 1,300 |
| 6 | Amyl ether of diethylene glycol $HO-CH_2-CH_2-O-CH_2-CH_2-O-C_5H_{11}$ | | 0.4 | 12.9 | 1,300 |
| 7 | 2-ethyl hexyl ether of diethylene glycol $HO-CH_2-CH_2-O-CH_2-CH_2-O-CH_2-C(C_2H_5)H-CH_2-CH_2-CH_2-CH_3$. | | <0.1 | 5.2 | 440 |
| 8 | Isobutyl ether of diethylene glycol $HO-CH_2-CH_2-O-CH_2-CH_2-O-CH_2-C(CH_3)H-CH_3$ | | | 20.0 | 1,800 |
| 9 | Dodecyl ether of diethylene glycol $HO-CH_2-CH_2-O-CH_2-CH_2-O-C_{12}H_{25}$ | | | | 150 |
| 10 | 3-heptyl ether of diethylene glycol $HO-CH_2-CH_2-O-CH_2-CH_2-O-C(C_2H_5)H-(CH_2)_3-CH_3$. | | | 5.5 | 470 |
| 11 | Cyclohexyl ether of diethylene glycol $HO-CH_2-CH_2-O-CH_2-CH_2-O-CH-CH_2-CH_2-CH_2-CH_2-CH_2$. | | | 15.6 | 1,900 |
| 12 | Bis-2-phenyl-2-hydroxyethyl ether of diethylene glycol $(C_6H_5)C(OH)H-CH_2-O-CH_2-CH_2-O-CH_2-CH_2-O-CH_2-H(OH)C(C_6H_5)$). | | | 6.49 | 1,100 |
| 13 | Glycerine initiated polypropylene oxide having an average mol. wt. of 3,700 capped with 10% ethylene oxide $C-O-(CH_2-C(CH_3)H-O-)_x(CH_2-CH_2-O-)_aH$ where $x \cong z \geq y$ and $a \cong c \geq b$ $C-O-(CH_2-C(CH_3)H-O-)_y(CH_2-CH_2-O-)_bH$ $C-O-(CH_2-C(CH_3)H-O-)_z(CH_2-CH_2-O-)_cH$ | 3,700 | 0.5 | 3.8 | 190 |
| 14 | Glycerine initiated polypropylene oxide having an average mol. wt. of 1,000 capped with 10% by weight ethylene oxide. | 2,800 | 3.4 | 20.6 | 1,500 |
| 15 | Polypropylene glycol having average mol. wt. of ~400 $HO-(CH_2-C(CH_3)H-O-)_nH$ | 3,200 | 9.0 | 11.1 | 720 |
| 16 | n-Hexylether of diethylene glycol $HO-CH_2-CH_2-O-CH_2-CH_2-O-C_6H_{13}$ | | | 11.8 | 1,700 |
| 17 | n-Heptyl ether of diethylene glycol $HO-CH_2-CH_2-O-CH_2-CH_2-O-C_7H_{15}$ | | | 9.3 | 1,300 |
| 18 | Butyl isopropyl diether of diethylene glycol $C_4H_9-O-CH_2-CH_2-O-CH_2-CH_2-O-CH(CH_3)_2$. | | | 11.3 | 1,000 |
| 19 | Glycerine initiated polypropylene oxide having an average mol. wt. of 1,501 capped with 10% ethylene oxide. | 3,800 | 0.5 | 7.9 | 440 |

For instance, the solvent may be separated from the extracted materials by standard methods such as distillation.

Example I

In all of the following extraction experiments, a brine was employed which contained 74 parts by weight of water, 9 parts by weight $CaCl_2$, 1 part by weight $MgCl_2$, 16 parts by weight NaCl and 4400 p.p.m. Br occurring about one half as LiBr and one half $CaBr_2$ (by weight). To 100 ml. of brine was added 100 ml. of solvent, the mixture was agitated about 30 minutes at about 75° F. and then allowed to stand until the distinct layers had

Example II

To a measured amount of the brine of Example I was added a measured amount of organic extraction agent (mono-n-butyl ether of diethylene glycol). The liquids were thoroughly agitated in a graduated container at about 75° F. then the mixture was allowed to stand in a graduated container until two layers formed. The volume of each layer was measured by reading the volume marking at the interface. Incremental amounts of water-immiscible liquids of the kinds indicated in the following table were added to aid in the layer separation, the mixtures being thoroughly agitated and allowed to stand and equilibrate between each addition of water-immiscible liquid. The following tabulates the results obtained:

TABLE II

| Experiment No.: | Ml. Brine | Ml. Solvent | Ml. of Water-immiscible liquid added | Water layer after mixing (ml.) | Organic layer after mixing (ml.) |
|---|---|---|---|---|---|
| 1 | 25 | 25 | | 31.5 | 18.0 |
| 2 | 25 | 25 | 1 ml. heptane | 31.5 | 19.0 |
| 3 | 25 | 25 | 4 ml. heptane | 33.0 | 20.0 |
| 4 | 25 | 25 | 6 ml. heptane | 34.5 | 21.0 |
| 5 | 25 | 25 | 7 ml. heptane | 36.5 | 21.5 |
| 6 | 25 | 25 | 1 ml. hexane | 31.5 | 18.5 |
| 7 | 25 | 25 | 4 ml. hexane | 33.0 | 20.0 |
| 8 | 25 | 25 | 7 ml. hexane | 36.0 | 20.0 |
| 9 | 25 | 25 | 1 ml. ethylene dichloride | 31.0 | 19.5 |
| 10 | 25 | 25 | 4 ml. ethylene dichloride | 32.0 | 21.5 |
| 11 | 25 | 25 | 7 ml. ethylene dichloride | 34.5 | 22.5 |
| 12 | 25 | 25 | 11 ml. ethylene dichloride | 39.0 | 23.0 |
| 13 | 25 | 25 | 1 ml. stoddard solvent | 32.0 | 18.5 |
| 14 | 25 | 25 | 4 ml. stoddard solvent | 34.0 | 20.0 |
| 15 | 25 | 25 | 7 ml. stoddard solvent | 37.0 | 20.0 |
| 16 | 46 | 12 | 3 ml. heptane | 16.0 | 45.0 |
| 17* | 25 | 25 | do | 24.0 | 26.0 |
| 18* | 25 | 25 | 2 ml. hexane | 26.0 | 26.0 |
| 19* | 25 | 25 | 4 ml. hexane | 27.0 | 27.0 |
| 20* | 25 | 25 | 10 ml. hexane | 33.0 | 27.0 |

*Runs 17, 18, 19, and 20: methyl ether of tripropylene glycol used as the organic extraction agent.

Example III

Employing the general procedure and the same brine composition of Example 1, the following compounds were mixed with the brine and agitated as 23° C. for about one hour, allowed to separate into layers and analyzed. The results were as follows:

TABLE III

| Name | Wt. percent Br in Organic phase | Wt. percent H$_2$O in Organic phase | Wt. percent Br in Aqueous phase | Wt. percent Li in Organic phase |
|---|---|---|---|---|
| Hexyl ether of triethylene glycol | .12 | 16.2 | .25 | |
| Butyl ether of triethylene glycol | .17 | 27.3 | .15 | |
| Phenyl ether of dipropylene glycol | .018 | 3.75 | .32 | |
| Amyl ether of triethylene glycol | .14 | 18.43 | .23 | |
| Phenyl ether of triethylene glycol | .088 | 7.81 | .26 | |
| Bis(2-phenyl-2-hydroxy ethyl ether) of heptaethylene glycol | .11 | 16.5 | .18 | .29 |
| Bis(2-phenyl-2-hydroxy ethyl ether) of triethylene glycol | .08 | 7.0 | .28 | .041 |
| Bis(2-phenyl-2-hydroxy ethyl ether) of dipropylene glycol | .023 | 5.8 | .31 | .022 |
| Amyl ether of tetraproplyene glycol | .085 | 19.8 | .28 | |
| Bis(2-phenyl-2-hydroxy ethyl ether) of heptaethylene glycol | .13 | 11.5 | .21 | |
| Methyl ether of tetraproplyene glycol | .024 | 6.8 | .27 | |

Example IV

In this example a brine similar to that used in Example I was employed, the difference being that the amount of Br values added to the brine was varied. The p.p.m. Br is the amount by weight of Br values in the brine, the Br being present about half as LiBr and about half as CaBr$_2$. A volume ratio of brine/solvent of about 1/1 was employed. The runs were made at about 67.5° C. and the mixtures were agitated about 12 hours before being allowed to stand. After the mixtures two-phased, the phases were analyzed and the results are as shown in Table IV.

To 100 ml of this brine was added 100 ml of n-hexyl ether of diethylene glycol. The mixture was agitated in a separatory funnel at about 23° C. and allowed to stand until the phases separated. Analysis of the phases produced the following results.

|  | Wt. in gms. | Weight percent H$_2$O | Weight percent Br | Weight percent Cl |
|---|---|---|---|---|
| Top Phase (solvent) | 102.1 | 10.3 | 0.093 | 1.05 |
| Bottom Phase (aqueous) | 110.65 | | 0.38 | 32.6 |

Various modifications can be made in the process of the present invention without departing from the spirit or scope thereof and it is understood therefore that the invention is limited only as defined in the appended claims.

I claim:

1. An improved process for the selective extraction of

TABLE IV

| Name | Brine P.p.m. Br | Organic Phase P.p.m. Br | Organic Phase Wt. percent H$_2$O | Organic Phase Wt. Percent Mg | Organic Phase Wt. Percent Ca | Organic Phase Wt. Percent Li | Organic Phase Wt. Percent Cl | Aqueous Phase P.p.m. Br | Aqueous Phase Wt. Percent Solid | Aqueous Phase Wt. Percent total Carbon |
|---|---|---|---|---|---|---|---|---|---|---|
| Bis(2-phenyl-2-hydroxy ethyl ether) of diethylene glycol | 850 | 160 | 6.7 | | | | | 720 | 32.4 | 3.8 |
| Do | 3,700 | 580 | 6.8 | Nil | .18 | .001 | 1.01 | 3,000 | 33.9 | 3.9 |
| n-Heptylether of diethylene glycol | 850 | 250 | 5.8 | | | | | 540 | 33.5 | 4.0 |
| Do | 3,700 | 340 | 6.1 | .01 | .18 | .0021 | 1.12 | 3,300 | 31.9 | 4.1 |
| 3-heptyl ether of diethylene glycol | 3,700 | 70 | 5.0 | Nil | .03 | .0005 | .24 | 3,300 | 32.7 | 3.9 |
| Isobuty ether of diethylene glycol | 850 | 240 | 11.6 | | | | | 560 | 30.6 | 1.8 |
| Do | 3,700 | 690 | 12.1 | .04 | .65 | .0054 | 2.94 | 3,000 | 31.7 | 1.7 |
| Cyclohexyl ether of diethylene glycol | 850 | 170 | 9.3 | | | | | 610 | 31.6 | 1.5 |
| Do | 3,700 | 550 | 9.6 | 0.3 | .56 | .0047 | 2.31 | 3,000 | 31.1 | 1.6 |
| 2-ethyl hexyl ether of diethylene glycol | 850 | 40 | 4.3 | | | | | 950 | 31.5 | 1.1 |
| Do | 3,700 | 60 | 4.1 | .02 | .14 | .0014 | .85 | 3,400 | 30.8 | 1.4 |
| Amyl ether of diethylene glycol | 850 | 100 | 8.5 | | | | | 690 | 34.5 | 3.3 |
| Do | 3,700 | 330 | 8.8 | .02 | .36 | .0035 | 1.71 | 3,100 | 32.4 | 3.3 |
| Phenyl ether of diethylene glycol | 850 | 150 | 8.8 | | | | | 740 | 30.1 | 1.2 |
| Do | 3,700 | 580 | 8.9 | .01 | .19 | .0018 | 1.67 | 3,100 | 30.1 | 1.4 |
| 2-octyl ether of diethylene glycol | 850 | 380 | 5.0 | | | | | 470 | 33.0 | 2.4 |
| Do | 3,700 | 570 | 4.9 | Nil | .08 | .0009 | .61 | 3,000 | 31.9 | 3.4 |
| n-Hexyl ether of diethylene glycol | 850 | 320 | 6.9 | | | | | 630 | 31.6 | 1.7 |
| Do | 3,700 | 570 | 7.1 | .01 | .34 | .0033 | 1.52 | 3,200 | 30.6 | 1.5 |
| Butyl ether of diethylene glycol | 1,000 | 190 | | | | | | 640 | | .648 |
| Do | 4,400 | 760 | 12.8 | | | | | 3,100 | 25.0 | 3.14 |

Example V

A natural brine was employed having the following analysis in weight percent:

Cl _____Percent__ 15
Br _____do____ 0.48
Mg _____do____ 0.34
Ca _____do____ 3.1
Sr _____do____ 0.22
Li _____p.p.m__ 210
B _____p.p.m__ 130
C _____p.p.m. (by carbon analysis)__ 300 metal bromides selected from the group consisting of lithium, calcium and magnesium bromides from brines containing both chlorides and said bromides which comprises intimately contacting with said brine an organic extraction agent which is a member selected from the group consisting of (1) a hydroxyether having the formula:

$$HO-(CH_2-CH_2-O)_n-R$$

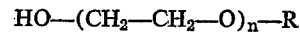

where $n$ represents a number of from 1 to about 8 and R represents a hydrocarbon radical containing from 4 to about 20 carbon atoms; (2) a group consisting of the phenyl ether of dipropylene glycol, the nonyl phenyl ether of dipropylene glycol, the methyl ether of tripropylene glycol, the methyl ether of tetrapropylene glycol, the amyl ether of tetrapropylene glycol, the hydroxyl ether of tripropylene glycol, bis(2-phenyl-2-hydroxyl ethyl ether) of tripropylene glycol, bis (2-phenyl-2-hydroxyl ethyl ether) of dipropylene glycol, dimethyl ether of diethylene glycol and butylisopropyl diether of diethylene glycol; (3) polypropylene glycols having an average molecular weight of about 200 to about 1000; (4) diethers of ethylene glycols having the formula:

HOC(C₆H₅)H—CH₂—O—(CH₂—CH₂—O)ₙ—CH₂—CH(C₆H₅)OH wherein $n$ is a number from 2 to 8; and (5) glycerine initiated polyoxyalkylene glycols having the formula:

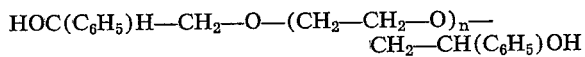

wherein $x$ and $a$ are numbers such that the average molecular weight of the compound is between 800 and 4000 and $a$ equals from 5 to 25 percent of the sum of $a$ plus $x$ and separating said organic extraction agent containing metal bromides from said brine.

2. The process according to claim 1 wherein the organic extraction agent is an organic hydroxy-ether having the formula:

HO—(CH₂—CH₂—O)ₙ—R wherein $n$ represents a number of 1 to 8 and R represents a hydrocarbon radical containing from 4 to about 20 carbon atoms.

3. The process according to claim 1 wherein the organic extraction agent is a polypropylene glycol having an average molecular weight of from about 200 to about 1000.

4. The process according to claim 1 wherein the organic extraction agent is a diether of polyethylene glycol having the formula:

HOC(C₆H₅)H—CH₂O—(CH₂CH₂—O)ₙ—CH₂—CH(C₆H₅)OH wherein $n$ is a number from 2 to 8.

5. The process according to claim 1 wherein the organic extraction agent is a glycerine initiated polyoxyalkylene glycol having the formula:

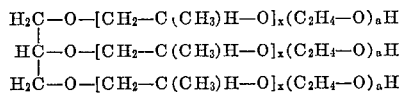

wherein $x$ and $a$ are numbers such that the average molecular weight of the compound is between 800 and 4000 and $a$ equals from 5 to 25 percent of the sum of $a$ plus $x$.

6. The process of claim 1 wherein the organic extraction agent is the n-butyl ether of diethylene glycol.

7. The process of claim 1 wherein the organic extraction agent is the methyl ether of tripropylene glycol.

8. The process of claim 1 wherein the metal bromide is lithium bromide.

9. The process of claim 1 wherein the organic extraction agent is the n-hexyl ether of diethylene glycol.

10. The process of claim 1 wherein the organic extraction agent is the isobutyl ether of diethylene glycol.

References Cited

UNITED STATES PATENTS

| | | | |
|---|---|---|---|
| 2,561,862 | 7/1951 | Hill | 23—312 X |
| 2,847,279 | 8/1958 | Tucker | 23—312 X |
| 2,968,523 | 1/1961 | Cunningham | 23—312 X |
| 2,969,275 | 1/1961 | Garrett | 23—312 X |
| 3,101,250 | 8/1963 | Schoenbeck | 23—87 |
| 3,107,154 | 10/1963 | Schacter | 23—216 X |
| 3,219,409 | 11/1965 | Asher | 23—89 |
| 3,214,248 | 10/1965 | Schwenk | 23—312 |

NORMAN YUDKOFF, *Primary Examiner.*

S. J. EMERY, *Assistant Examiner.*

U.S. Cl. X.R.

23—89, 90, 91